July 26, 1938.   M. G. KURTH   2,124,623
PACKING ASSEMBLY
Filed Oct. 2, 1935

INVENTOR
Matthew G. Kurth
BY Wheeler, Wheeler and Wheeler
ATTORNEYS

Patented July 26, 1938

2,124,623

UNITED STATES PATENT OFFICE 2,124,623

PACKING ASSEMBLY

Matthew G. Kurth, Madison, Wis.

Application October 2, 1935, Serial No. 43,185

6 Claims. (Cl. 309—30)

This invention relates to improvements in packing assemblies.

It is the object of the invention to provide an improved form of packing in combination with the article to be packed, whereby helical packing is interlocked with a piston or the like and is radially and axially expanded.

In the drawing.

Like parts are identified by the same reference characters throughout the several views.

It will be understood that the present disclosure showing the packing applied to the external periphery of a piston is merely illustrative of its application internally or externally to any member requiring packing.

The piston 3 is of more or less conventional form having a wrist pin at 4 and an elongated packing groove 5, the groove being extended by under-cutting the piston wall at 6, leaving an annular flange 7.

Figure 2:
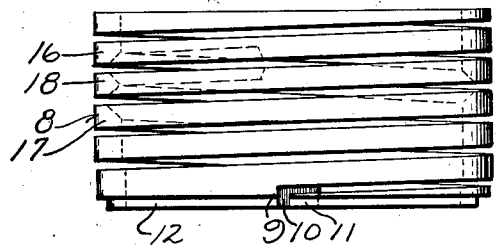
Figure 2 is a side elevation of a helical packing member separately.

Closely confined within the groove 5 is a helical packing member 8 which, as illustrated, consists of six turns or coils of a helix, each end coil being built up as shown at 9 to provide a shoulder, preferably beveled as indicated at 10 in Fig. 2, beside which the tapered extremity 11 of the end coil is extended in overlapping relation.

Figure 1:
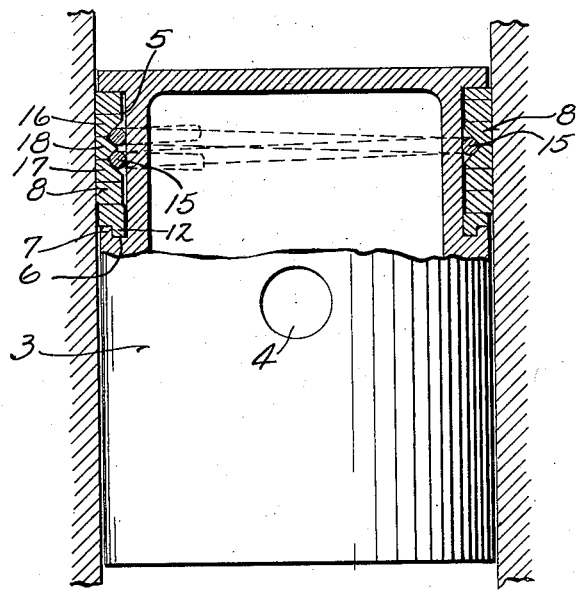
Figure 1 is a view showing a piston partially in side elevation and partially in section, the packing applied thereto being illustrated in section.

The entire coil is preferably also provided along its inner periphery with an axially projecting flange at 12 which is interlocked behind flange 7 of the piston to hold the end coil somewhat contracted, as clearly appears in Fig. 1. This arrangement prevents any of the lower terminal surfaces of the helix from contating the walls of the cylinder in which the piston 3 operates, and thereby eliminates much scoring of the cylinder walls. The joint between the parts 10 and 11 is preferably located directly over the wrist pin 4 so that this joint will not be directly subject to the side-slap which occurs at the sides 90 degrees removed from the wrist pin ends.

Between the helix 8 and the peripheral wall of groove 5 is confined a resiliently expansible helix 15 of spring wire which, in the present device, is approximately one and one quarter turns in length. The coils 16 and 17 of the helical packing member 8 are covered in opposite corners, and the turn or coil 18 of the helical packing 8 is beveled on both corners to receive the wire spring 15.

The spring 15, being confined under pressure, tends to expand radially and thereby to wedge the coils 16, 17 and 18 apart to increase both the length and diameter of the helical packing 8. This ensures a tight fit between both ends of the helical packing and the piston, and it also promotes a close engagement of the intermediate coils of the packing with the walls of the cylinder in which the piston operates. The interlocking engagement of an end coil with the piston, which holds such an end coil approximately .020 or .030" smaller than the other coils, prevents the end coil from being subject to expanding action of the spring 15.

The portion of the piston containing the wrist pin 4 usually comprises a relatively heavy boss which provides the wrist pin bearings. When the piston is heated the increased mass of metal at this point tends to increase the expansion of the piston, and the proximity of the end coil of the packing to this boss is another reason for slightly reducing the diameter of the end coil as compared with the diameter of other coils of the packing.

I claim:

1. The combination with a piston having a grooved wall under-cut to provide a peripheral flange, of packing means in the groove having a complementary flange engaged behind the flange of the piston, said packing comprising a helix having said flange upon an end coil and having said end coil slightly restricted in diameter as compared with other coils of said helix, the other end coil of said helix and the complementary surface of the piston being finished to provide a position-fixing abutment to receive all reaction axially of said packing helix, whereby the axial location of said other end coil is positively fixed and none of such reaction thrust is delivered radially outwardly by said other end coil.

2. The combination with a piston having a grooved wall under-cut to provide a peripheral flange, of packing means in the groove having a complementary flange engaged behind the flange of the piston, said packing comprising a helix having said flange upon an end coil and having said end coil slightly restricted in diameter as compared with other coils of said helix, together with a spring expander confined between the piston and intermediate coils of said helix and acting on said helix to increase a dimension thereof.

3. A packing comprising the combination with a helix having at least one coil provided with beveled corners, of a helical spring seated in said corners under radial compression in a direction to thrust asunder the beveled portions of the helix.

4. A packing comprising the combination with a helical wire spring under stress, of a helical packing member having its successive turns provided with edge surfaces in substantial face contact for a substantial part of the thickness of said turns and having beveled surfaces adjacent their corresponding peripheries between which said spring is engaged, the pressure of said spring being exerted in the direction of the packing surface provided by the faces of said turns adjacent which their edge surfaces are in substantial contact.

5. A packing comprising the combination with a helical wire spring under stress, of a helical packing member having beveled surfaces between which said spring is engaged, said spring having a length in excess of one full turn, and the terminal portions of said packing member being located beyond the ends of said spring.

6. The combination with a piston having a grooved wall, the piston at one end of said groove providing a substantially planiform thrust surface at right angles to the piston axis, and at the other end of the groove being under-cut to provide a peripheral flange, of a helix in the groove having an end coil provided with a complementary flange engaged behind the flange of the piston and slightly restricted in diameter by the interengagement of said flanges as compared with the diameter of other coils of said helix, the other end coil of said helix having a substantially planiform surface in fixed terminal abutment with the said planiform thrust surface of said piston at the end of said groove other than the under-cut end thereof.

MATTHEW G. KURTH.